(12) United States Patent
Webb et al.

(10) Patent No.: US 9,396,065 B2
(45) Date of Patent: Jul. 19, 2016

(54) EXTENSIBLE MEMORY HUB

(71) Applicant: Intel Corporation, Santa Clara, CA (US)

(72) Inventors: Randall K. Webb, Hillsboro, OR (US); Jawad B. Khan, Cornelius, OR (US); Richard L. Coulson, Portland, OR (US); Knut S. Grimsrud, Forest Grove, OR (US); Brian M. Yablon, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 200 days.

(21) Appl. No.: 14/314,181

(22) Filed: Jun. 25, 2014

(65) Prior Publication Data

US 2015/0378814 A1 Dec. 31, 2015

(51) Int. Cl.
*G06F 3/00* (2006.01)
*G06F 13/12* (2006.01)
*G06F 11/10* (2006.01)
*G06F 12/02* (2006.01)

(52) U.S. Cl.
CPC ........ *G06F 11/1068* (2013.01); *G06F 11/1016* (2013.01); *G06F 12/0246* (2013.01); *G06F 2212/7201* (2013.01)

(58) Field of Classification Search
None
See application file for complete search history.

(56) References Cited

U.S. PATENT DOCUMENTS

| | | | | |
|---|---|---|---|---|
| 8,990,470 B1* | 3/2015 | Sala | ........................ | H04L 29/06 710/105 |
| 9,053,008 B1* | 6/2015 | Horn | ......................... | G06F 3/06 |
| 2009/0019211 A1* | 1/2009 | Bandholz | .............. | G06F 3/0607 711/103 |
| 2011/0022666 A1* | 1/2011 | Pinto | .................... | G06F 13/4247 709/206 |
| 2013/0290606 A1* | 10/2013 | Alessi | ................... | G06F 1/3275 711/103 |

* cited by examiner

*Primary Examiner* — David E Martinez
(74) *Attorney, Agent, or Firm* — Grossman, Tucker, Perreault & Pfleger, PLLC

(57) ABSTRACT

The present disclosure relates to an extensible memory hub. An apparatus may include a first extensible non-volatile memory (NVM) hub (EN hub). The first EN hub includes an upstream interface port configured to couple the first EN hub to an NVM controller or to a second EN hub; a downstream interface port configured to couple the first EN hub to a third EN hub or to a NVM device; at least one NVM device port, each NVM device port configured to couple the first EN hub to a respective NVM device via a NVM channel; and an EN hub controller. The EN hub controller includes command logic configured to initialize the first EN hub in response to an initialize chain command from the NVM controller, the initializing including enumerating each NVM device coupled to the first EN hub and each of one or more associated NVM dies.

21 Claims, 10 Drawing Sheets

EXTENSIBLE MEMORY HUB

FIELD

The present disclosure relates to a memory hub, in particular, an extensible non-volatile memory hub.

BACKGROUND

Volatile memory is computer memory that does not retain memory cell states when not powered. Random access memory (RAM) is an example of volatile memory. Non-volatile memory (NVM) is computer memory that retains memory cell states when not powered. NVM is typically used for long-term persistent storage. NVM includes, for example, hard disk drives, optical disks, solid-state drives, etc.

BRIEF DESCRIPTION OF DRAWINGS

Features and advantages of the claimed subject matter will be apparent from the following detailed description of embodiments consistent therewith, which description should be considered with reference to the accompanying drawings, wherein:

Figure 1:
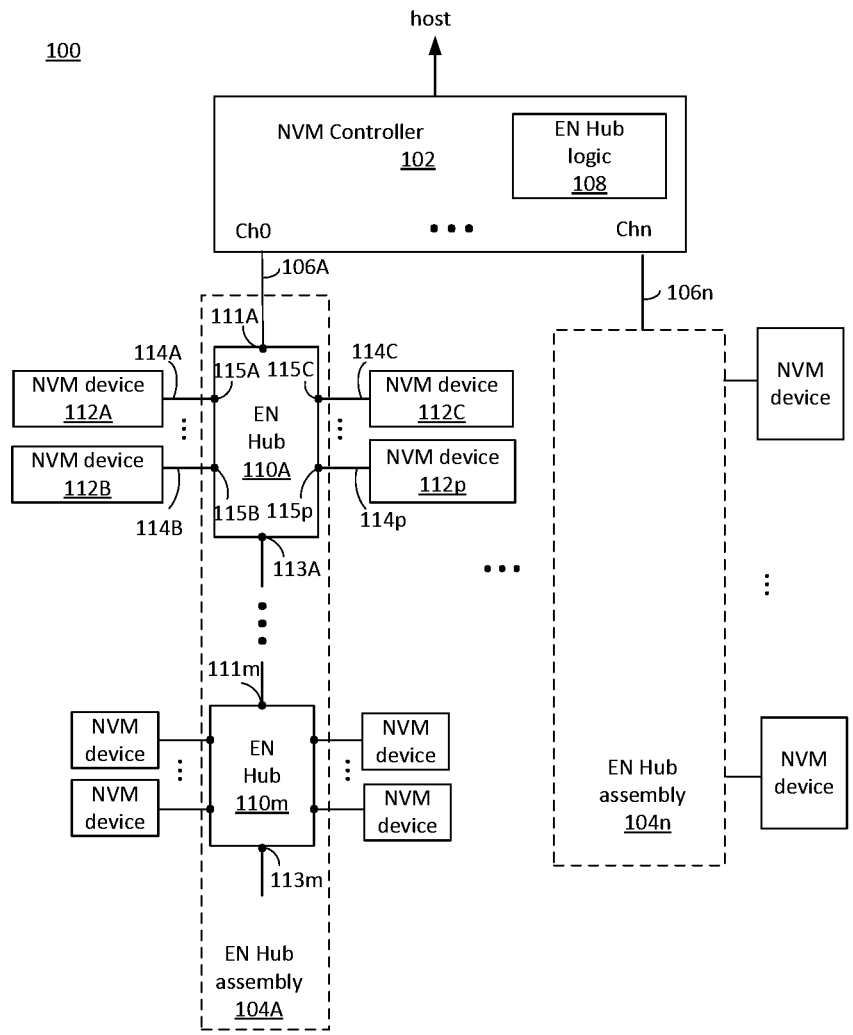
FIG. 1 illustrates a system block diagram consistent with several embodiments of the present disclosure.

Although the following Detailed Description will proceed with reference being made to illustrative embodiments, many alternatives, modifications, and variations thereof will be apparent to those skilled in the art.

DETAILED DESCRIPTION

Typically, in a solid state drive (SSD), one or more NVM device(s) are coupled to an NVM controller by each of one or more communication channels. Conventionally, storage capacity of an SSD may be increased by increasing the number of NVM devices per communication channel and/or increasing the number of communication channels in the SSD. Increasing the number of communication channels may also improve performance, e.g., bandwidth.

Typically, increasing the number of communication channels in an SSD includes a corresponding increase in the number of controller channel ports of the NVM controller. Thus, increasing the number of communication channels may increase pin count and/or die size of the NVM controller and may increase cost. Each communication channel is subject to electrical loading that increases as the number of NVM devices attached to a respective communication channel increases. The electrical loading may result in decreased signal integrity and/or capacitive loading that decreases communication channel maximum frequency and results in an overall reduction in performance of the SSD. Active switches may be utilized to couple only active NVM devices to the respective communication channel and decouple inactive NVM devices. Adding switches may increase capacitive loading and/or die area, and, thus, cost.

Generally, this disclosure describes a system, apparatus and method configured to facilitate increasing the memory capacity of an SSD without necessarily increasing the number of controller channel ports of an associated NVM controller. The system includes at least one extensible NVM hub (EN hub) configured to couple at least one NVM device to the NVM controller. An EN hub, consistent with the present disclosure, is extensible in that such an EN hub is configured to provide a growth path for an SSD that allows increasing memory capacity without necessarily adding controller channel ports to the NVM controller and without additional electrical loading on existing communication channels. NVM may include, but is not limited to, phase change memory (PCM), a three dimensional cross point memory, resistive memory, nanowire memory, ferro-electric transistor random access memory (FeTRAM), flash memory such as NAND or NOR, magnetoresistive random access memory (MRAM), memory that incorporates memristor technology, spin transfer torque (STT)-MRAM, etc.

Each EN hub is configured to provide a point to point connection between the EN hub and at least one NVM device. Each EN hub is further configured to couple to one or more other EN hubs in a chain of EN hubs thereby providing expansion capability without increasing a number of controller channel ports of the NVM controller. Each EN hub may be configured to regenerate command(s), address(es) and/or data for transmission out a respective upstream or downstream interface port, as described herein. One controller channel may couple a respective controller channel port of the NVM controller and a first EN hub. The first EN hub may be a first EN hub in a chain of EN hubs. One or more NVM device(s) may be coupled to each EN hub by a respective NVM channel.

Each EN hub is configured to expose an upstream interface port, a downstream interface port and one or more NVM device interface ports that may comply with an NVM memory interface specification. Such NVM specification may define an interface between an NVM device (e.g., an NVM die and/or an NVM package) and a memory controller (e.g., an NVM controller). Memory devices that comply with such NVM specification may then be coupled to an EN hub NVM interface port. Communication between each EN hub and coupled NVM memory device(s) may then be configured to comply with the NVM memory specification and/or related communication protocol. For example, for NAND-type flash memory devices, the NVM device interface ports may comply or be compatible with the Open NAND Flash Interface (ONFi) Specification, version 3.0, published Mar. 9, 2011, by the ONFi Workgroup, and/or later versions of this specification, for example, the Open NAND Flash Interface Specification, version 4.0, published Apr. 2, 2014, by the ONFi Workgroup. Thus, in this example, each EN hub may be coupled to any NAND device that complies with the ONFi specification(s).

The upstream interface is configured to couple the EN hub to the NVM controller or to a downstream interface of an adjacent upstream EN hub in the chain of EN hubs. The downstream interface is configured to couple the EN hub to the upstream interface of an adjacent downstream EN hub or to a NVM device. As used herein, "upstream" means in a direction in the chain toward the NVM controller and "downstream" means in a direction away from the NVM controller. Each upstream interface port is configured to couple the EN hub to a controller channel and/or a NVM channel. Each downstream interface port is configured to couple the EN hub to a controller channel and/or a NVM channel. Each NVM device interface port is configured to couple the EN hub to a NVM channel. As used herein, "communication channel" means a controller channel and/or a NVM channel. A communication channel includes an input/output (I/O channel) and a control channel, as described herein.

A NVM device may include one or more NVM die(s). One or more NVM devices may be included in a NVM package. For example, a single die package (SDP) includes one NVM die, a dual die package (DDP) includes two NVM dies, a quad die package (QDP) includes four NVM dies, an octal die package (ODP) includes eight NVM dies and a hex die package (HDP) includes sixteen NVM dies. For example, a NAND die may include 8 gigabytes (GB) of storage. In another example, a NAND die may include 16 GB of storage. Of course, other NVM dies may include the same, more or less storage capacity. Each NVM package may include one or more individually addressable NVM devices, i.e., may include one or more NVM device interface(s). Each NVM device interface is configured to be coupled to a respective NVM channel. In an embodiment, an EN hub may be a discrete component coupled to a NVM package that includes one or more NVM dies. In another embodiment, an EN hub and one or more NVM dies may be integrated into an integrated circuit. The integrated circuit may then be included in an integrated package.

A system and method that includes EN hub(s) consistent with the present disclosure is configured to provide relatively higher capacity memory systems using an NVM controller with relatively fewer controller channel ports. Memory capacity may then be increased by adding EN hubs and associated NVM devices. The additional capacity may be realized without a performance penalty associated with adding NVM devices to a conventional bus structure where a plurality of NVM devices couple to one bus.

Further, an NVM controller with relatively fewer controller channel ports may be utilized for both relatively lower storage capacity and relative higher storage capacity applications. Thus, a growth path may be provided that avoids either specifying an NVM controller with excess capacity initially or initially specifying a relatively lower capacity NVM controller that may later be replaced with a relatively higher capacity NVM controller.

FIG. 1 illustrates a system block diagram 100 consistent with several embodiments of the present disclosure. The system 100 includes an NVM controller 102, one or more EN hub assembly(ies) 104A, . . . , 104n and a plurality of NVM devices 112A, . . . , 112p. The NVM controller 102 is configured to couple the EN hub assembly(ies) 104A, . . . , 104n and NVM devices to a host, e.g., a host computer, and to manage memory access operations. The NVM controller 102 may be configured to perform NVM block management, wear leveling (i.e., distribute write locations), manage read disturbs, manage free space (e.g., "garbage collection"), provide error correction code (ECC) protection, power/performance balancing, ECC recovery and/or read/write caching. The NVM controller 102 may further include EN hub logic configured to provide controller functionality related to the EN hub assembly(ies) 104A, . . . , 104n, as described herein.

Each EN hub assembly 104A, . . . , 104n is coupled to the NVM controller 102 at a respective controller channel port, Ch 0, . . . , Ch n, by a respective controller channel 106A, . . . , 106n. A controller channel includes an input/output (I/O) channel and a control channel. The I/O channel is configured to carry commands, addresses and/or data. The control channel is configured to carry one or more control signals. As used herein, a communication channel corresponds to a plurality of conductive elements, e.g., printed circuit board (PCB) traces, configured to provide a plurality of conductive paths. Thus, each communication channel may include a plurality of conductive paths. The I/O channel is configured for serial/parallel operation. In other words, a command may be transmitted followed by an address followed by data. Thus, the I/O channel may be shared by commands, addresses and/or data. Thus, each controller channel port is configured to couple the NVM controller 102 to a controller channel.

Each EN hub assembly, e.g., EN hub assembly 104A, includes one or more EN hub(s) 110A, . . . , 110m. Each EN hub 110A, . . . , 110m includes a respective upstream interface port 111A, . . . , 111m, a respective downstream interface port 113A, . . . , 113m and one or more NVM device interface ports, e.g., NVM device interface ports 115A, . . . , 115p. Thus, each interface port is configured to couple an EN hub to a controller channel and/or a NVM channel. Each EN hub, e.g., EN hub 110A, may be coupled to one or more NVM devices 112A, . . . , 112p by respective NVM channels 114A, . . . , 114p at respective NVM device ports 115A, . . . , 115p. A NVM channel includes an input/output (I/O) channel and a control channel. The I/O channel is configured to carry commands, addresses and/or data. The control channel is configured to carry one or more control signals. The I/O channel of a NVM channel may typically correspond to the I/O channel of an controller channel. The control channel of an controller channel may be related to the control channel of a NVM channel but may or may not have one to one correspondence.

One EN hub, e.g., EN hub 110A, of EN hub assembly 104A is coupled to the NVM controller 102 at Ch 0 by upstream port 111A and controller channel 106A. In some embodiments, EN hub 110A may be coupled to one or more other EN hubs in a chain. In other words, the downstream port 113A of EN hub 110A may be coupled to an upstream port of an adjacent EN hub in the chain and so forth until a final EN hub, e.g., EN hub 110m. The downstream port 113m of the final EN hub 110m in the chain may be not connected or may be connected to another NVM device.

Additional NVM devices may be coupled to a respective controller channel port Ch 0, . . . , Ch n, by adding NVM devices to an existing EN hub, e.g., EN hub 110A and/or adding EN hub(s) and NVM devices. Electrical loading may be limited since each controller channel port Ch 0, . . . , Ch n drives only the first EN hub in a chain, e.g., EN hub 110A. Additional EN hubs may be added to, e.g., EN hub assembly 104A and/or additional NVM devices may be coupled to EN hub assembly 104A without adding capacitance and/or electrical loading to controller channel port Ch 0.

For example, NVM devices 112A, . . . , 112p may correspond to NAND devices. Continuing with this example, NVM device interface ports 115A, . . . , 115p may then correspond to NAND device interface ports. In some embodiments, the NAND device interface ports may be configured to be compatible with the ONFi specification(s), as referenced herein.

EN hub logic 108 is configured to include functionality related to EN hubs 110A, . . . , 110m that may not be included in an NVM interface specification and/or protocol. Commands related to discovery, addressing, control and status of the EN hubs 110A, . . . , 110m may be managed by EN hub logic 108. For example, an initialize chain command may be configured to allow the NVM controller 102 to determine a topology of attached EN hubs 110A, . . . , 110m and NVM devices. Topology includes whether EN hub(s) are attached to the controller channel port(s) Ch 0, . . . , Ch n, a number of EN hub(s) in each chain, a number of interface ports on each attached EN hub and a storage capacity of each attached NVM device. The initialize chain command may be further configured to assign a unique identifier to each EN hub, identify each interface port and/or to assign a volume address to each NVM die. For example, EN hub logic 108 may be configured to assign the unique identifier to each EN hub, to identify each interface port and to assign a volume address to each NVM die. In another example, each EN hub may be configured to determine the unique identifier, to identify each interface port, to assign a volume address to each NVM die and to provide the identifier(s) and volume address(es) to the NVM controller 102. Thus, the initialize chain command is configured to result in unique addresses for each NVM device and NVM die in a system that includes at least one EN hub. Each unique address may include an EN hub identifier, interface port identifier and volume address.

In operation, memory accesses may be initiated by selecting an EN hub and/or selecting an interface port on a selected EN hub. For example, the EN hub logic 108 may send a select hub and/or select port command to an EN hub assembly that includes the selected EN hub. In another example, the EN hub logic may send a select volume command and/or a control signal that corresponds to an encoded chip enable identifier. The command may be followed by e.g., the unique EN hub identifier, interface port number and volume address of a target NVM die. Memory access operations may then be sent that comply and/or are compatible with an NVM interface specification and/or protocol.

EN hub logic 108 may be further configured to request and/or receive commands and/or data related to status of any EN hub. The EN hub may be configured to reply to the request with a status indicator that corresponds to a current status of the EN hub. Status indicators may include, for example, hub busy, hub idle, hub fault, etc.

For example, for NVM devices that are NAND devices, addressing individual NAND dies within a NAND device may be configured to utilize ONFi volume addressing functionality associated with CE_n pin reduction. CE_n is an active low chip enable signal. A NAND die, in this example, and compatible with the ONFI specification, corresponds to a NAND device portion that may be enabled by one CE_n signal. A CE_n signal may be used to select a target. As defined in the ONFi specification, a NAND target is a set of LUNs that share one CE_n signal within one NAND package. LUN corresponds to logical unit number and is a minimum unit that can independently execute commands and report status. Each NAND target includes one or more LUNs. Thus, as used herein NAND die corresponds to NAND target of the ONFi specification(s) referenced herein.

A CE_n pin reduction mechanism enables a single CE_n pin to be shared by a plurality (i.e., group) of NAND targets. In this example, the group of NAND targets (i.e., NAND dies) corresponds to a NAND device. The CE_n pin reduction mechanism is configured to facilitate addressing a plurality of NAND targets using relatively fewer CE_n pins. Without the CE_n pin reduction mechanism, individually addressing, for example, sixteen NAND targets would utilize four CE_n pins. With CE_n pin reduction and assuming a four-bit volume address, one CE_n pin may be utilized to address fifteen NAND targets. Addressing individual NAND targets is accomplished by assigning (i.e., "appointing" in the ONFi spec.) a respective volume address to each NAND target in the group during an initialization sequence. Thereafter, one NAND target in the group may be selected using a volume select command. In operation, the group is selected when the associated CE_n signal goes low. The associated CE_n signal going low is then followed by a volume select command that includes a volume address of the NAND target to be selected. The NAND target assigned the volume address is then configured to execute the command that follows the select volume command. In this manner, a plurality of NAND targets may share one CE_n signal and individual targets in the group may be selected using respective assigned volume addresses.

Each EN hub, e.g., EN hubs 110A, . . . , 110m may be configured to utilize volume addressing and/or similar selection functionality for selecting individual NVM dies included in a NVM device. The EN hub(s) and NVM controller (and EN hub logic 108) are configured to support an initialize chain command that is configured to assign a respective unique identifier (ID) to each EN hub, e.g., EN hubs 110A, . . . , 110m, in a chain, e.g., EN hub assembly 104A. For example, the EN hub logic 108 may be configured to assign a unique EN hub ID to a first EN hub, e.g., EN hub 110A in an EN hub assembly, e.g., EN hub assembly 104A. EN hub 110A may be configured to receive the hub address assignment command and a first hub identifier from the NVM controller 102 and associated EN hub logic 108. The first EN hub 110A may be configured to capture and store the first hub identifier. In an embodiment, the first EN hub 110A may be configured to generate a second hub identifier by incrementing the first hub identifier and to provide the hub address assignment command and second hub identifier to a second EN hub (i.e., adjacent downstream hub) in the chain. Each subsequent EN hub in the chain is configured to repeat the process until the hub address assignment command and $m^{th}$ hub identifier reaches the last EN hub, e.g., EN hub 110m, in the chain. In another embodiment, the EN hub logic 108 may be configured to assign a unique EN hub ID to each EN hub in the chain. For example, after the first EN hub 110A has been assigned a unique ID, the EN hub logic 108 may send a second unique EN hub ID. The first EN hub 110A may then be configured to provide the hub address assignment command and the second unique ID to the second hub in the chain.

During or after hub address assignment, each EN hub 110A, . . . , 110m may be configured to provide a respective number of interface ports that the EN hub 110A, . . . , 110m supports. For example, the respective number of interface ports may be provided in response to a request from NVM controller 102 (and EN hub logic 108). Each EN hub 110A, . . . , 110m and/or EN hub logic 108 may be further configured to determine a number of NVM dies for each NVM device 112A, . . . , 112p coupled to a respective NVM interface port 115A, . . . , 115p. The number of NVM dies per NVM device 112A, . . . , 112p may vary. In one example, NVM devices 112A, . . . , 112p may each include the same number of NVM die(s). In another example, a first subset of NVM devices may include a first number of NVM die(s) and a second subset may include a second number of NVM die(s). For each EN hub, e.g., EN hub 110m, that may have a NVM device coupled to a downstream interface port, the EN hub 110m may be configured to determine whether a NVM device is coupled to the downstream interface port and, if so, to determine a number of NVM dies for that NVM device.

In an embodiment, each EN hub 110A, . . . , 110m may then initiate volume address assignment for each NVM device that includes a plurality of NVM dies. For example, the volume address assignment may be initiated in response to a command from the NVM controller 102. Each EN hub 110A, . . . , 110m may then be configured to associate port number with the associated volume addresses. Each EN hub 110A, . . . , 110m may then be configured to store the association information (i.e., port ID, volume addresses) in the EN hub 110A, ..., 110m and to provide the information to the NVM controller 102. In another embodiment, the NVM controller 102 and/or EN hub logic 108 may perform volume address assignment for each EN hub 110A, ..., 110m and for each NVM device that includes a plurality of NVM dies.

For example, for EN hubs coupled to NAND devices, each EN hub 110A, ..., 110m may initiate CE_n pin reduction volume address assignment for each NAND device that includes a plurality of NAND dies. For example, the CE_pin reduction volume address assignment may be initiated in response to a command from the NVM controller 102. Each EN hub 110A, ..., 110m may then be configured to associate port number with the associated volume addresses. Each EN hub 110A, ..., 110m may then be configured to store the association information (i.e., port ID, volume addresses) in the EN hub 110A, ..., 110m and to provide the information to the NVM controller 102. In another embodiment, the NVM controller 102 and/or EN hub logic 108 may perform CE_n pin reduction volume address assignment for each EN hub 110A, ..., 110m and for each NAND device that includes a plurality of NAND dies.

The NVM controller 102 and/or EN hub logic 108 may then be configured to associate port number with the associated volume addresses. The NVM controller 102 and/or EN hub logic 108 may then be configured to store the association information (i.e., port ID, volume addresses) in the EN hub 110A, ..., 110m and in the NVM controller 102. In operation, the NVM controller 102 and/or EN hub logic 108 may then select a specific NVM die to access by providing a hub identifier, port identifier and volume address. Thus, the NVM die corresponding to the volume address coupled to the identified port on the identified EN hub may be selected.

In an embodiment, EN hub logic 108 and/or NVM controller 102 may be configured to extend a response time to, e.g., a command that may be specified in an NVM specification and/or protocol. The extended response times are configured to accommodate any additional latency associated with the chain structure of the EN hub assemblies 104A, ..., 104n and communication-related operations of the EN hub(s). For example, each hub may be configured to regenerate command(s), address(es) and/or data for transmission out a respective upstream or downstream interface port, as described herein. Thus, a response from a downstream EN hub, e.g., EN hub 110m, that may be three or four EN hubs away from the NVM controller 102 may take hundreds of nanoseconds to reach the NVM controller 102. On the other hand, a NVM device directly connected to the NVM controller 102 may take on the order of twenty nanoseconds. For example, NAND devices may be generally unaffected by the additional latency as their latencies associated with memory access operations (i.e., reads and writes) tends to be higher. The regeneration facilitates implementing EN hub assemblies that each include a plurality of EN hubs since transmitted command(s), address(es) and/or data may degrade a finite amount between EN hubs before being regenerated by the EN hub.

For example, for NAND device that are configured for double data rate (DDR), a strobe signal for the data bus, DQ strobe (DQS) is used for data transfers. A NAND device configured for DDR, utilizes both the rising and falling edges of a clock signal for a data strobe signal. The latching edge of the DQS is center-aligned to a valid data window for data transfers from the NVM controller 102 to the NAND device (writes). The latching edge of the DQS is aligned to the transition of the DQ channel (i.e., I/O channel) for data transfers from the NAND device to the NVM controller (reads). Thus, relative timing of data and DQS impacts whether each data bit can be latched and is therefore specified in the ONFi specification. DQS is one example of a signal where EN hub logic 108 and/or NVM controller 102 may be configured to extend the response time specified in the ONFi specification(s) as referenced herein. Since the data and/or DQS may be regenerated by an EN hub, relative timing may be preserved.

Thus, existence and/or operation of each EN hub may be transparent to each NVM device. An amount of NVM memory coupled to an NVM controller may then be extensible by adding EN hub(s) and/or NVM devices while avoiding performance issues associated with additional NVM device coupled directly to a bus and/or coupled to a bus via one or more switches. The NVM controller 102 may then be relatively simpler with fewer pins and therefore relatively lower cost.

Figure 2:
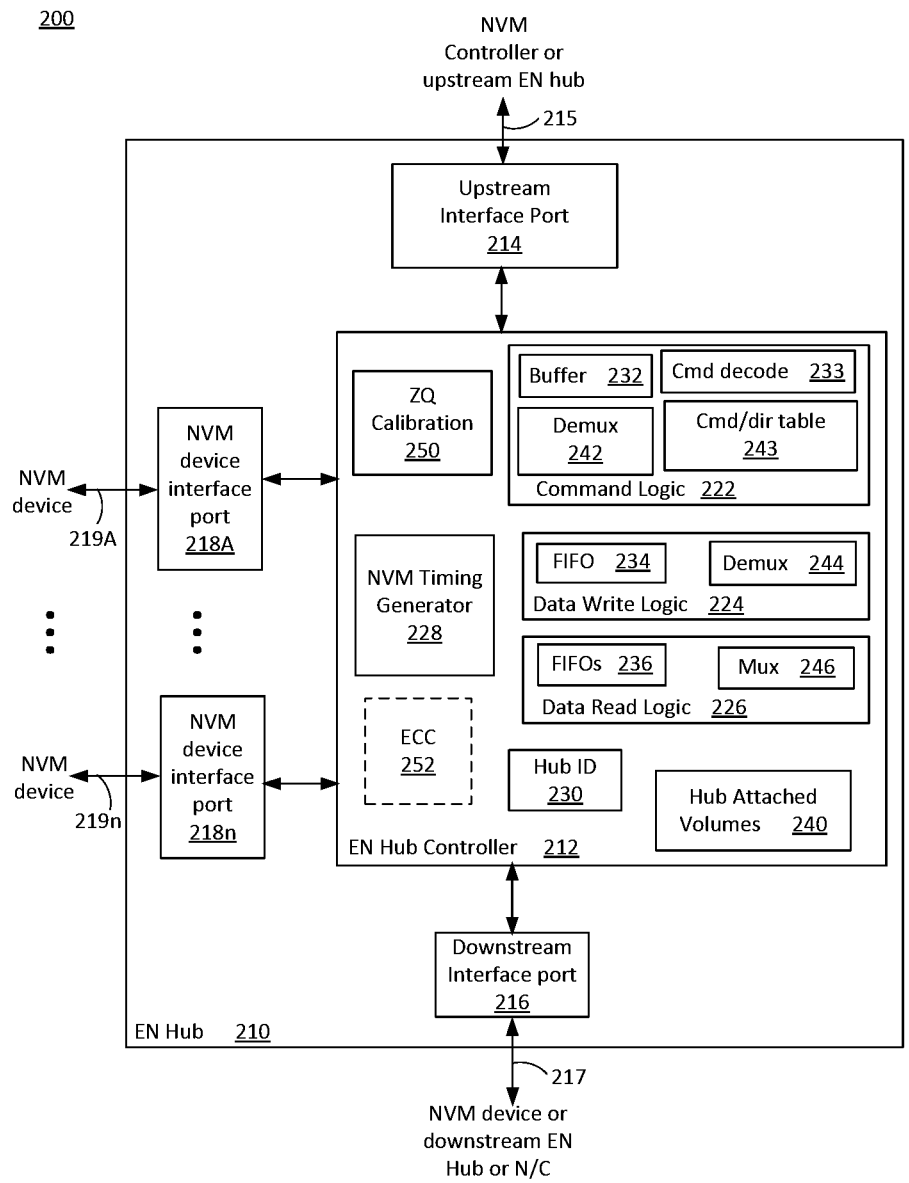
FIG. 2 illustrates an example extensible NVM hub consistent with various embodiment of the present disclosure.

FIG. 2 illustrates an example EN hub 210 consistent with various embodiment of the present disclosure. EN hub 210 is one example of EN hubs 110A, ..., 110m of FIG. 1. EN hub 210 includes an EN hub controller 212, an upstream interface port 214, a downstream interface port 216 and one or more NVM device interface port(s) 218A, ..., 218n. Each interface port may be coupled to a respective communication channel 215, 217, 219A, ..., 219n.

The upstream interface port 214 and associated controller channel 215 are configured to couple the EN hub 210 to an NVM controller or an adjacent upstream EN hub. The NVM device interface port(s) 218A, ..., 218n and associated NVM channel(s) 219A, ..., 219n are configured to couple the EN hub 210 to one or more NVM device(s). The downstream interface port 216 and associated controller/NVM channel 217 are configured to couple the EN hub 210 an adjacent downstream EN hub or a NVM device or may not be connected.

EN hub controller 212 includes command logic 222, data write logic 224, data read logic 226 and a NVM timing generator 228. EN hub controller 212 includes a hub ID store 230 and a hub attached volumes store 240. EN hub controller 212 may include ZQ calibration logic 250. In some embodiments, EN hub controller 212 may include error correction code logic ECC 252.

Command logic 222 includes a buffer 232, command decode logic 233, a command/direction table 243 and may include a demultiplexer (demux) 242. Command logic 222 is configured to receive command(s) from upstream interface port 214. Commands may be transmitted asynchronously. Command logic 222 is configured to receive and process asynchronous commands. Command logic 222 is configured to determine whether a command is for EN hub 210 or another EN hub and to respond accordingly. For example, if a received command is not for EN hub 210, EN hub 210 may send the received command out on downstream interface port 216 and associated channel 217. In another example, if the command is for EN hub 210, command logic 222 may be configured to decode the command and to initiate and/or perform operation(s) associated with the command. For example, for EN hubs configured to couple to NAND devices, one or more of the commands may comply or be compatible with the ONFi specification(s) referenced herein. Data write logic 224 is configured to manage writing data to one or more NVM device(s) and data read logic 226 is configured to read requested data from a NVM device associated with received addressing information.

In response to an initialize chain command received on upstream interface port 214 via upstream channel 215, command logic 222 is configured to receive and store a hub ID 230. Command logic 222 is further configured to discover (i.e., determine) a number of NVM device(s) coupled to the EN hub 210 and to discover respective numbers of NVM dies associated with each coupled NVM device. For example, for NVM dies that are NAND dies, the discovery process associated with determining the respective numbers of NAND dies may comply or be compatible with the ONFi specification(s) referenced herein. For example, in response to a read ID command, each NVM die in a NVM device is configured to output a respective unique NVM die ID, set during manufacturing. Command logic 222 may then be configured to determine a number of NVM dies by, e.g., counting unique NVM identifiers. Command logic 222 is further configured to assign a respective volume address to each discovered attached NVM die, associate the volume address(es) with an appropriate interface port identifier and transmit the information out the upstream interface port 214 to the NVM controller, e.g., NVM controller 102. Command logic 222 may then store the volume address(es) and associated interface port identifiers in hub attached volumes 240. When discovery and/or initialization operations are completed, command logic 222 may switch to operational mode.

Command logic 222 is configured to receive commands, addresses and/or data from, e.g., NVM controller 102 and/or an upstream EN hub. The received commands, addresses and/or data may be temporarily stored in buffer 232. Command decode logic 233 is configured to decode each command and/or address to determine an appropriate response based, at least in part on command/direction table 243. Command/direction table 243 is configured to store EN hub-specific commands (e.g., commands related to the EN hub and/or NVM devices coupled to the EN hub) and other commands and related data direction. Other commands may be related to upstream and/or downstream EN hub(s). Data direction may then correspond to from upstream to downstream or from downstream to upstream. If command decode logic 233 determines that a received command should be routed to an attached NVM device or to a downstream EN hub, command decode logic 233 is configured to set demultiplexer 242 to couple command logic 222 to an appropriate NVM interface port 218A, . . . , 218n or downstream interface port 216. Command logic 222 may then utilize NVM timing generator 228 to reset timing associated with the received command, address(es) and/or data. In this manner, since the decoding operation consumed some time, the timing of the command, address and/or data signal(s) may be re-established to within a bound of and NVM interface specification and/or protocol, e.g., the ONFi specification(s) referenced herein. Thus, latency associated with decoding is accommodated. Further, quality of the timing signal may not be degraded as it traverses, e.g., a chain of EN hubs since the timing signal may be regenerated at each EN hub.

Data write logic 224 is configured to write received data to a designated NVM device. Received data may be stored in FIFO (first in first out) buffer 234 prior to being written. Command logic may be configured to set demultiplexer (demux) 244 to couple FIFO 234 to a NVM device interface port 218A, . . . , 218n or downstream interface port 216 (if downstream NVM channel 217 is coupled to a NVM device) in response to a write command from, e.g., NVM controller 102 that has an associated address of a NVM die coupled to EN hub 210. Data write logic 224 may then be configured to provide appropriate control signal(s) on the selected control channel and the data on the selected I/O channel of the selected NVM channel. The control signal(s) may correspond to an NVM specification and/or protocol. For example, for NAND devices, the control signals may correspond to the ONFi specification(s) referenced herein.

For example, write operations to a NAND device may take on the order of ones of milliseconds while read operations may take on the order of hundreds of microseconds. Communication from the NVM controller to the EN hub(s) and/or processing received commands and/or addresses by the command logic may take on the order of ones of microseconds or less. Thus, latency associated with memory access operations within a NAND device is generally not affected by processing times associated with EN hub operations.

Data read logic 226 is configured to read data from a designated NVM device (and NVM die). Read data may be stored in one of FIFO buffers 236. For example, FIFO buffers 236 may include a respective FIFO for each NVM device interface port 218A, . . . , 218n and downstream interface port 216. An output of each FIFO of FIFO buffers 236 may be coupled to an input of multiplexer (mux) 246. An output of mux 246 may be coupled to upstream interface port 214. Command decode logic 233 may be configured to set mux 246 to couple a NVM device interface port 218A, . . . , 218n or downstream interface port 216 and associated FIFO to upstream interface port 214 in response to a read command from NVM controller 102. The read command may have an associated address that corresponds to a NVM die coupled to EN hub 210. Data read logic 226 may then be configured to provide appropriate control signal(s) on the selected control channel. The control signal(s) may correspond to an NVM specification and/or protocol. For example, for NAND devices, the control signals may correspond to the ONFi specification(s) referenced herein.

ZQ calibration of NVM device channels and/or controller channels (i.e., NVM device and/or controller I/O channels) may be performed initially and/or periodically during operation. Periodic calibration (i.e., ZQ calibration) is configured to account for voltage and temperature variations. In conventional SSDs that do not include EN hub(s), all data transfers may be halted during the ZQ calibration operations. In an embodiment consistent with the present disclosure, ZQ calibration operations may be performed on individual NVM device channels while other NVM devices continue to operate normally. In other words, the EN hub(s) may isolate selected NVM devices during ZQ calibration operations without affecting other unselected (for ZQ calibration) NVM devices.

It may be appreciated that non-volatile memory cells are generally lossy storage media. Thus, stored data bits may degrade over time resulting in data read errors. ECC (Error Correction Code) functionality is configured to correct for at least some of these errors in order to preserve data integrity. Each NVM device may include additional storage that may be used for storing ECC. ECCs may be calculated based on data stored during write operations and are checked when the data is read. The ECC may be further utilized in one or more error correction algorithms configured to correct at least some of the detected errors. Thus, ECC functionality may further include operations configured to correct detected errors.

In some embodiments, EN hub controller 212 may include ECC (error correction code) logic 252. ECC logic 252 is configured to attach parity information, e.g., an ECC, to data being stored (i.e., during write operations). The ECC logic 252 may be further configured to determine parity checks (i.e., error syndromes) that may then be utilized to correct data read from a NVM device. The EN hub 210 may then provide corrected data to the NVM controller 102. One or more techniques may be used for error correction, e.g., Hamming codes (a family of linear error-correcting codes), Reed-Solomon codes (non-binary cyclic error correcting codes), Low Density Parity Check Codes (LDPCs), BCH (Bose- Chaudhuri-Hocquenghem) codes (a class of cyclic error correcting codes that are constructed utilizing finite fields), etc. In some embodiments, the NVM controller 102 may be configured to enable or disable the error correcting function in the EN hub 210 by, e.g., setting or resetting an ECC bit.

In some embodiments, a protocol (i.e., NVM specification) used for communication with the NVM devices may differ from a protocol used for communication between the NVM controller and the EN hubs. For example, one or more EN hub(s) may be configured to interface to NAND devices that operate in Toggle mode. Toggle mode is a NAND-type flash memory interface protocol utilized by Samsung™ Electronic and/or Toshiba Corporation in their respective NAND-type flash memory devices. Toggle mode protocol may differ from the ONFi specification(s) referenced herein. In this example, the EN hub may be configured to translate between Toggle mode and ONFi. Thus, if the NVM controller is configured for ONFi, the EN hub 210 may be configured to communicate with the NVM controller according to the ONFi specification. The EN hub 210 may be further configured to communicate with the NAND device(s) according to Toggle mode. Thus, the protocol used to communicate with the NAND devices may be transparent to the NVM controller.

Thus, a system including EN hub(s) consistent with the present disclosure may provide point to point connectivity between a plurality of NVM devices and one or more EN hub(s). A respective first EN hub may be connected to each one of one or more controller channel port(s), e.g., Ch 0, . . . , Ch n and one or more other EN hubs may be coupled to each first EN hub in a chain configuration. Storage capacity of an associated SSD may be increased by adding NVM devices and/or adding EN hubs while avoiding additional electrical loading on controller channels. Thus, maximum allowed data rates, not limited by channel loading, may be facilitated. For example, data rates on the order of hundreds of megatransfers per second may be accommodated. As used herein, megatransfer corresponds to megabytes.

FIGS. 3 through 8 illustrate example NVM systems that include at least one extensible NVM hub consistent with various embodiments of the present disclosure.

Figure 3:
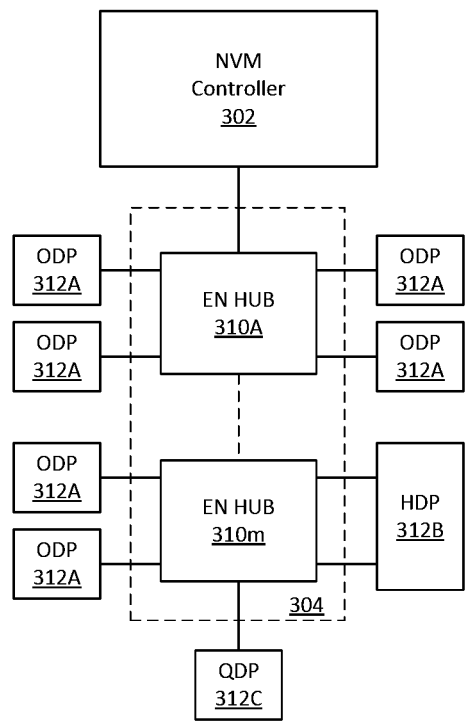
FIGS. 3 through 8 illustrate example NVM systems that include at least one extensible NVM hub consistent with various embodiments of the present disclosure.

FIG. 3 illustrates one example NVM system 300 consistent with one embodiment of the present disclosure. System 300 includes an NVM controller 302 and one EN hub assembly 304 coupled to one controller channel port of the NVM controller 302. The EN hub assembly 304 includes a plurality of EN hubs 310A, . . . , 310m coupled in one chain. The first (i.e., nearest the NVM controller in the chain) EN hub 310A is coupled to four ODPs (octal die packages), individually 312A. A last EN hub 310m in the chain is coupled to four NVM devices: two ODPs 312A, one HDP 312B and one QDP 312C. In this example, each ODP 312A is coupled to a respective NVM device interface port and HDP 312B is coupled to two NVM device interface ports of EN hub 310m, and QDP 312C is coupled to a downstream port of EN hub 310m. Thus, a variety of NVM devices and/or NVM dies may be coupled to a respective EN hub.

Figure 4:
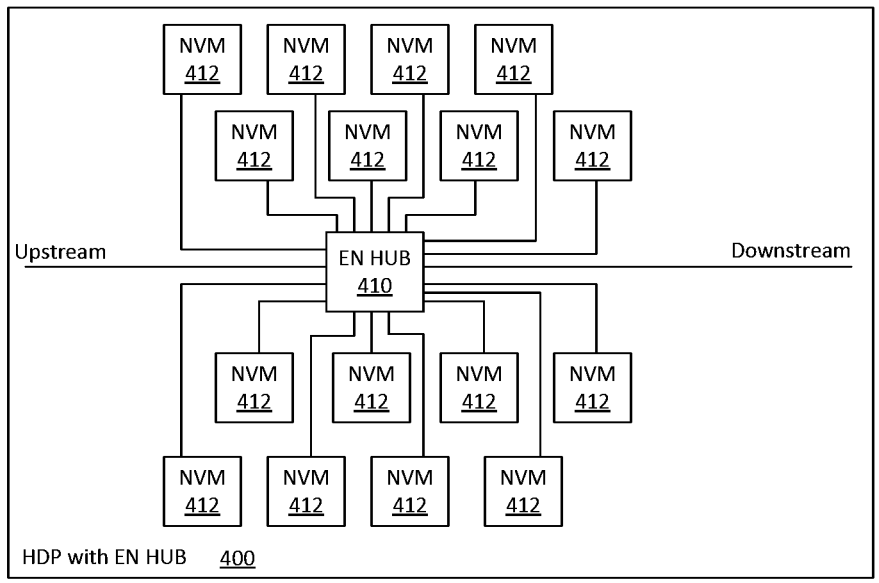

FIG. 4 illustrates another example NVM system 400 consistent with one embodiment of the present disclosure. System 400 includes one EN hub 410 coupled to sixteen NVM dies (i.e., dice). System 400 is configured to illustrate an EN hub embedded in an HDP with the 16 NVM dies. System 400 may be coupled to an NVM controller or another EN hub upstream and may be coupled to another EN hub or NVM device downstream. Thus, in one embodiment, an EN hub may be configured as a discrete element coupled to one or more NVM device(s). In another embodiment, an EN hub may be integrated into an integrated circuit package that includes one or more NVM die(s).

Figure 5:
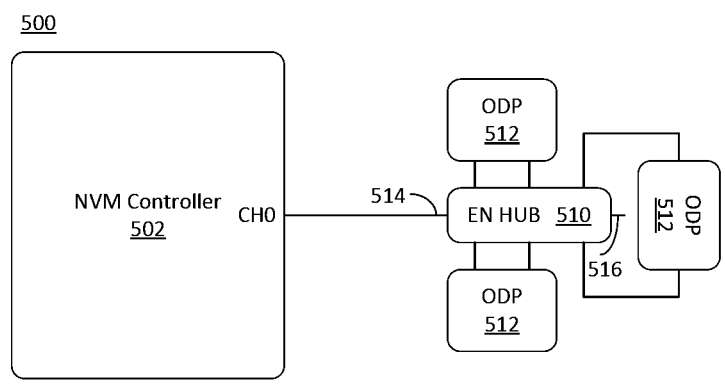

FIG. 5 illustrates another example NVM system 500 consistent with one embodiment of the present disclosure. System 500 includes an NVM controller 502 and one EN hub 510. An upstream interface port 514 is coupled to one controller channel port Ch 0 of the NVM controller 502. The EN hub 510 includes six interface ports and is coupled to each of three ODPs, individually 512, by two respective NVM channels. The EN hub 510 includes a downstream interface port 516 that is not connected in this example.

Figure 6:
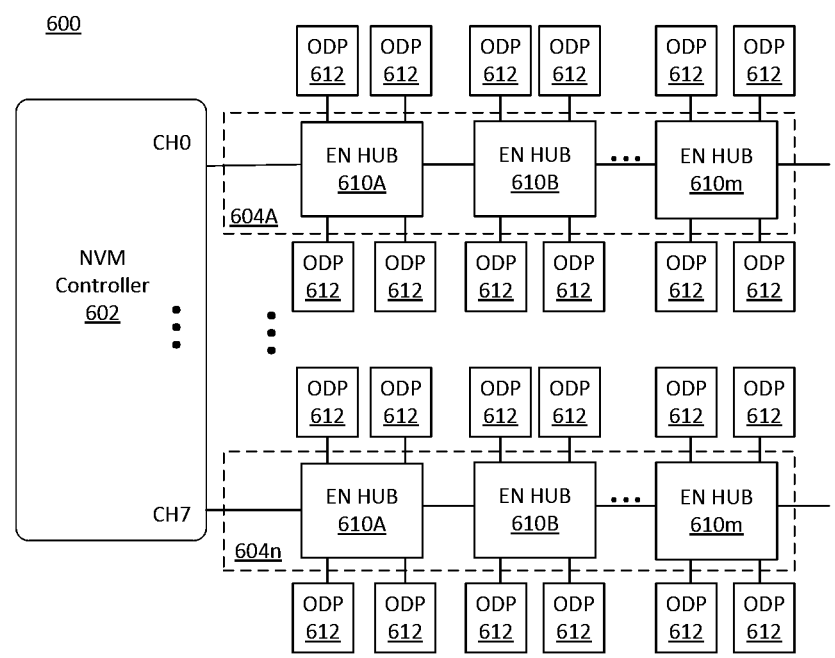

FIG. 6 illustrates another example NVM system 600 consistent with one embodiment of the present disclosure. System 600 includes an NVM controller 602 and eight EN hub assemblies 604A, . . . , 604n. Each EN hub assembly is coupled to a respective controller channel port Ch 0, . . . , Ch 7 of the NVM controller 602. Each EN hub assembly, e.g., EN hub assembly 604A includes a plurality of EN hubs 610A, . . . , 610m coupled in one chain. Each EN hub, e.g., EN hub 610A, is coupled to four ODPs, individually 612. A downstream port of the last EN hub 610m in each chain is not connected.

Figure 7:
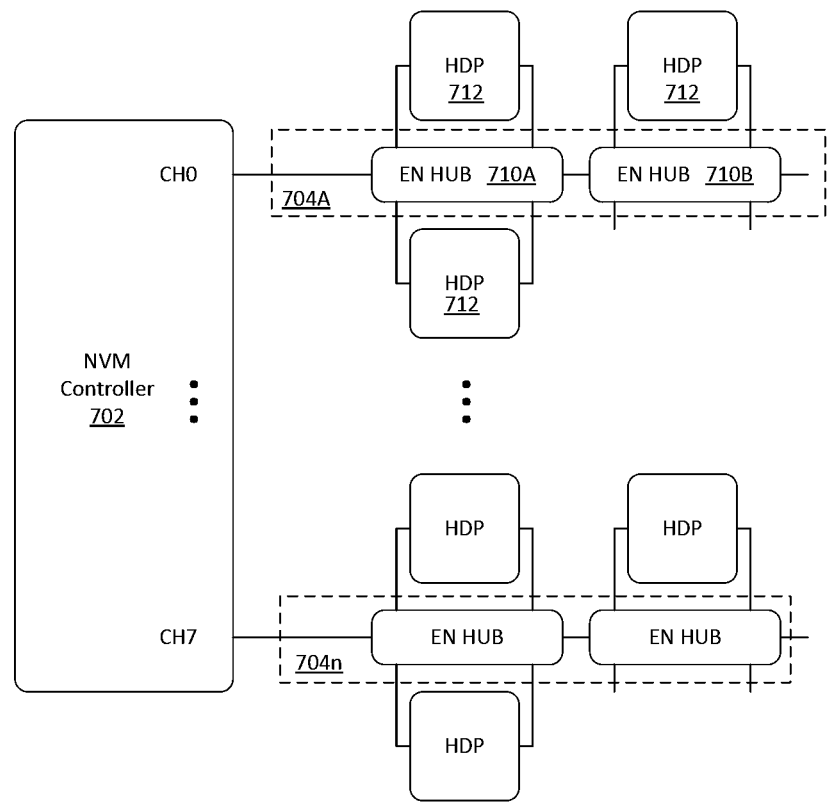

FIG. 7 illustrates another example NVM system 700 consistent with one embodiment of the present disclosure. System 700 includes an NVM controller 702 and eight EN hub assemblies 704A, . . . , 704n. Each EN hub assembly 704A, . . . , 704n is coupled to a respective controller channel port Ch 0, . . . , Ch 7 of the NVM controller 702. Each EN hub assembly, e.g., EN hub assembly 704A, includes two EN hubs 710A, 710B coupled in one chain. A first EN hub 710A is coupled to each of two HDPs, individually 712, by two NVM channels per HDP 712. A second EN hub 710B is coupled to one HDP 712 by two channels and has three ports (e.g., two NVM interface ports and one downstream port) not connected.

Figure 8:
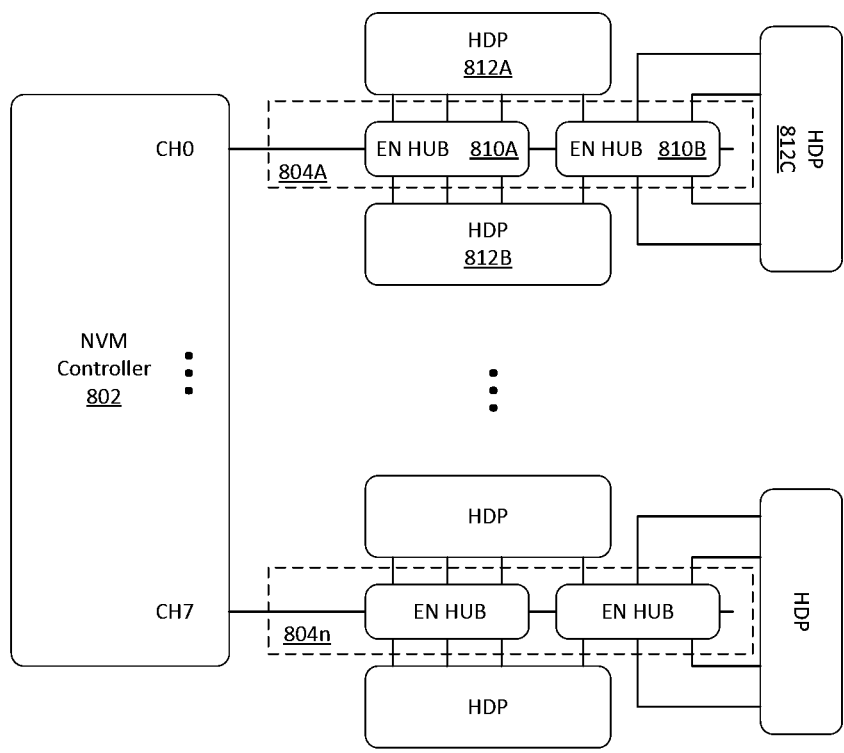

FIG. 8 illustrates another example NVM system 800 consistent with one embodiment of the present disclosure. System 800 includes an NVM controller 802, eight EN hub assemblies 804A, . . . , 804n and three HDPs, e.g., HDP 812A, 812B, 812C, per EN hub assembly. Each EN hub assembly 804A, . . . , 804n is coupled to a respective controller channel port Ch 0, . . . , Ch 8 of the NVM controller 802. Each EN hub assembly, e.g., EN hub assembly 804A includes two EN hubs 810A, 810B coupled in one chain. Each HDP 812A, 812B, 812C is coupled to four NVM channels. The first HDP 812A is coupled to the first EN hub 810A by three NVM channels and to the second EN hub 810B by one NVM channel. The second HDP 812B is coupled to the first EN hub 810A by three NVM channels and to the second EN hub 810B by one NVM channel. The third HDP 812C is coupled to the second EN hub 810B by four NVM channels. The downstream port of the second EN hub 810B is not connected. Thus, as illustrated in this example NVM memory system 800, one NVM device may be coupled to NVM interface port(s) of more than one EN hub.

FIGS. 3 through 8 illustrate a variety of topologies for systems including EN hub(s) consistent with the present disclosure. The EN hubs may be discrete components coupled to discrete memory devices and/or may be embedded in a package with NVM dies. NVM devices may be coupled to one or more EN hubs by one or more NVM channels.

Figure 9:
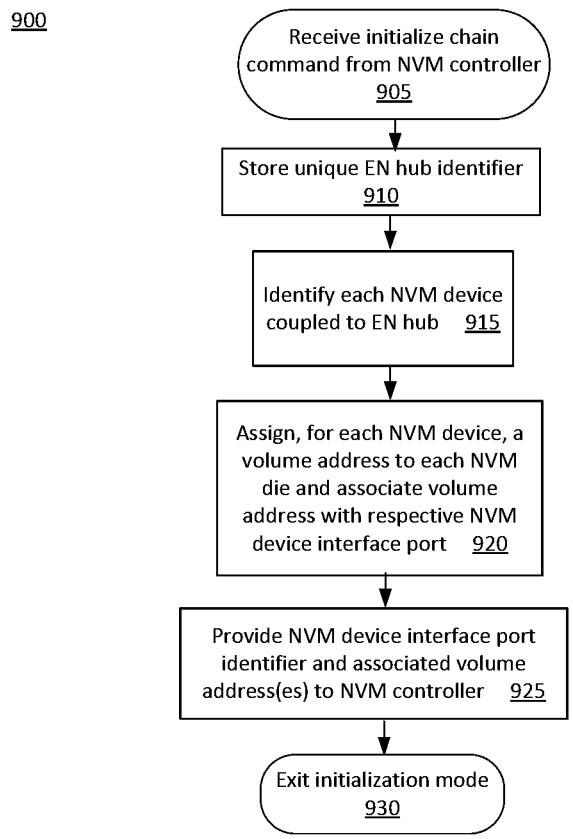
FIG. 9 illustrates a flowchart of initialization operations of an extensible NVM hub consistent with various embodiments of the present disclosure.

FIG. 9 illustrates a flowchart 900 of initialization operations of an extensible NVM hub consistent with various embodiments of the present disclosure. The operations may be performed, for example, by an extensible NVM hub, e.g., EN hub 110A, . . . , 110m, 210, and/or an NVM controller, e.g., NVM controller 102. Flowchart 900 depicts exemplary operations configured to initialize an EN hub assembly. In particular, flowchart 900 depicts exemplary operations configured to enumerate each EN hub, NVM device and NVM die included in the EN hub assembly, as described herein.

Operations of flowchart 900 may begin with operation 905, receiving an initialize chain command from an NVM controller. For example, the initialize chain command may be received in response to powering up the NVM controller and/or EN hub. For example, the NVM controller may be coupled to a first EN hub. The first EN hub may be the first EN hub in a chain of EN hub(s). Operation 910 includes storing a unique EN hub identifier. For example, the unique hub identifier may be determined by the NVM controller. In another example, the unique hub identifier may be determined by an upstream EN hub. Each NVM device coupled to the EN hub may be identified at operation 915. For example, each NVM device identifier may be related to a NVM device interface port of the EN hub. Operation 920 includes assigning, for each NVM device, a volume address to each NVM die included in the NVM device. Operation 920 may further include associating the volume address(es) with the NVM device interface port of the respective NVM device. The NVM device interface port identifier and associated volume address(es) may be provided to the NVM controller at operation 925. For example, the EN hub may be configured to transmit the NVM device interface port identifier and associated volume address(es) to the NVM controller. The EN hub may be configured to exit initialization mode at operation 930.

Figure 10:
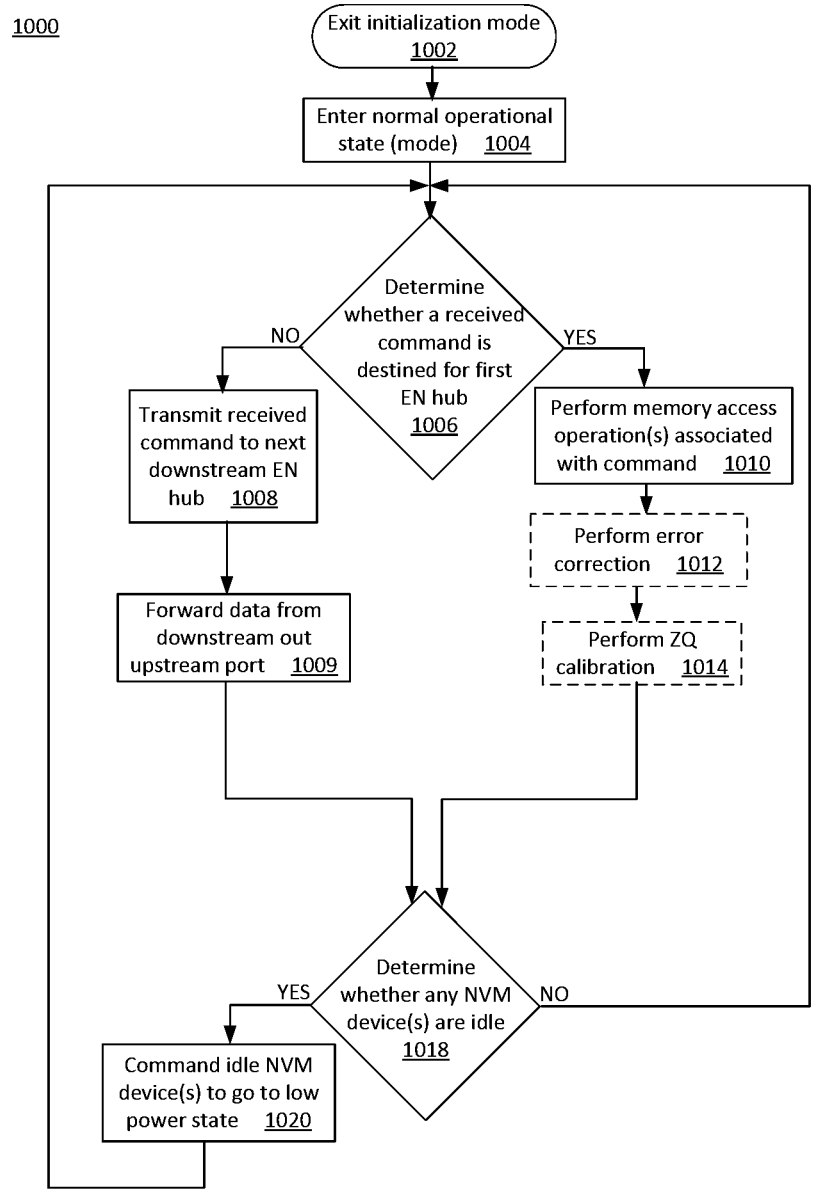
FIG. 10 illustrates a flowchart of operations of an extensible NVM hub consistent with various embodiments of the present disclosure.

FIG. 10 illustrates a flowchart 1000 of operations of an extensible NVM hub consistent with various embodiments of the present disclosure. The operations may be performed, for example, by an extensible NVM hub, e.g., EN hub 110A, . . . , 110n, 210. Flowchart 1000 depicts exemplary operations that may be performed in a normal operating mode. In particular, flowchart 1000 depicts exemplary operations configured to perform memory access operations, transmit commands, address(es) and/or data downstream in a chain of EN hub(s), transmit data upstream in the chain of EN hub(s) and/or to manage operations of one or more NVM device(s), as described herein.

Operations of flowchart 1000 may begin at operation 1002 in response to exiting initialization mode. For example, initialization operations of flowchart 900 may be performed by an EN hub in initialization mode. Operation 1004 includes entering a normal operational state, i.e., mode. For example, memory access operations may be performed by an EN hub configured to operate in the normal operation mode. Whether a received command is destined for a first EN hub may be determined at operation 1006. For example, the received command may be received from an NVM controller. The first EN hub may be configured to determine whether the received command is destined for the first EN hub based, at least in part, on, e.g., an EN hub identifier associated with the received command. If the received command is not destined for the first EN hub, the received command may be transmitted to a next downstream EN hub at operation 1008. Operation 1008 may include regenerating the received command, as described herein. For example, the next downstream EN hub may be coupled to a downstream interface port of the first EN hub. Operation 1009 includes forwarding addresses and/or data from a downstream interface port to an upstream interface port. For example, the data may be destined for an NVM controller. In some embodiments, the forwarding may include regenerating the addresses and/or data, as described herein.

If the received command is destined for the first EN hub, memory access operations associated with the received command may be performed at operation 1010. For example, memory access operations may include reading from one or more NVM die(s) included in a NVM device coupled to the first EN hub at a NVM interface port. The NVM die(s) to be read from may be selected based, at least in part, on volume address(es) associated with the read command. The read data may then be transmitted out an upstream interface port of the first EN hub. In another example, memory access operations may include writing to one or more NVM die(s) included in a NVM device coupled to the first EN hub at a NVM interface port. The address(es) of the data to be written and the associated data may be received on the upstream interface port of the first EN hub. The NVM die(s) to be written to may be selected based, at least in part, on volume address(es) provided with the write command.

In some embodiments, operation 1012 may include one or more error correction operation(s). In some embodiments, one or more of operations 1012 may be included in operations 1010. For example, an ECC may be determined for data to be written to a NVM device and may be written to the NVM device with the data. In another example, the ECC may be processed with data read from the NVM device. In this example, the ECC may be used to correct error(s) in the read data. In some embodiments, ZQ calibration may be performed on one or more NVM channels and/or the controller channel at operation 1014. Other NVM device(s) may be configured to continue normal operation while ZQ calibration is performed on a selected NVM channel.

Whether any NVM devices are idle may be determined at operation 1018. For example, a NVM device that is not actively performing memory access operation(s) may be idle. If there are no idle NVM device(s), program flow may proceed to operation 1006. If there are idle NVM device(s), the idle NVM device(s) may be commanded to go into a low power state at operation 1020. Program flow may then proceed to operation 1006. Switching idle NVM device(s) to the low power state is configured to decrease power consumption of a system that includes EN hub(s) consistent with the present disclosure.

While FIGS. 9 and 10 illustrate various operations according one embodiment, it is to be understood that not all of the operations depicted in FIGS. 9 and 10 are necessary for other embodiments. Indeed, it is fully contemplated herein that in other embodiments of the present disclosure, the operations depicted in FIGS. 9 and 10 and/or other operations described herein may be combined in a manner not specifically shown in any of the drawings, but still fully consistent with the present disclosure. Thus, claims directed to features and/or operations that are not exactly shown in one drawing are deemed within the scope and content of the present disclosure.

Figure 11:
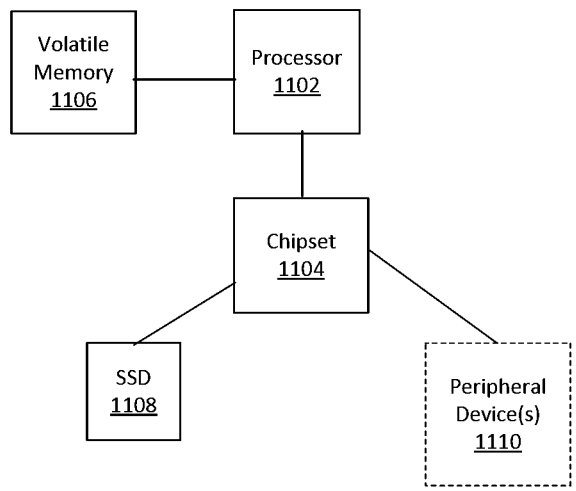
FIG. 11 illustrates a system block diagram consistent with several embodiments of the present disclosure.

FIG. 11 illustrates a system block diagram 1100 consistent with several embodiments of the present disclosure. SSD 1108 is one example of system 100 of FIG. 1. System 1100 may correspond to a computing device including, but not limited to, a server, a workstation computer, a desktop computer, a laptop computer, a tablet computer (e.g., iPad®, GalaxyTab® and the like), an ultraportable computer, an ultramobile computer, a netbook computer and/or a subnotebook computer; a mobile telephone including, but not limited to a smart phone, (e.g., iPhone®, Android®-based phone, Blackberry®, Symbian®-based phone, Palm®-based phone, etc.) and/or a feature phone.

System 1100 includes a processor 1102, a chipset 1104, volatile memory 1106 and a solid state drive 1108. Chipset 1104 is configured to couple processor 1102 to SSD 1108. Volatile memory 1106 may include, for example, random access memory and/or cache memory. In some embodiments, system 1100 may include one or more peripheral device(s) 1110 coupled to system 1100 by chipset 1104. Peripheral device(s) 1110 may include, for example, user interface device(s) including a display, a touch-screen display, printer, keypad, keyboard, etc., communication logic, wired and/or wireless, storage device(s) including hard disk drives, solid-state drives, removable storage media, etc.

The processor 1102 is coupled to the SSD 1108. Processor 1102 may provide read and/or write requests including memory address(es), and/or associated data to SSD 1108 and may receive read data from SSD 1108. For example, processor 1102 may receive one or more memory access request(s) from one or more of the peripheral devices 1110 and may provide corresponding read and/or write requests to SSD 1108. It should be noted that system 1100 is simplified for ease of illustration and description.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

In some embodiments, a Verilog hardware description language (HDL) may be used to specify circuit and/or logic implementation(s) for the various logic and/or circuitry described herein. For example, in one embodiment, the HDL may comply or be compatible with IEEE standard 62530-2011: SystemVerilog—Unified Hardware Design, Specification, and Verification Language, dated Jul. 7, 2011; IEEE Std 1800™-2012: IEEE Standard for SystemVerilog-Unified Hardware Design, Specification, and Verification Language, released Feb. 21, 2013; IEEE standard 1364-2005: IEEE Standard for Verilog Hardware Description Language, dated Apr. 18, 2006 and/or other versions of Verilog HDL and/or SystemVerilog standards.

Thus, this disclosure describes a system, apparatus and method configured facilitate increasing the memory capacity of an SSD without necessarily increasing the number of controller channel ports of an associated NVM controller. The system includes at least one EN hub configured to couple at least one NVM device to the NVM controller. Each EN hub is configured to provide a point to point connection between the EN hub and at least one NVM device. Each EN hub is further configured to couple to one or more other EN hubs in a chain of EN hubs thereby providing expansion capability without increasing a number of controller channel ports of the NVM controller. One controller channel may couple a respective controller channel port of the NVM controller and a first EN hub. The first EN hub may be a first EN hub in a chain of EN hubs. One or more NVM device(s) may be coupled to each EN hub by a respective NVM channel.

EXAMPLES

Examples of the present disclosure include subject material such as a method, means for performing acts of the method, a device, or of an apparatus or system related to an extensible non-volatile memory hub, as discussed below.

Example 1

According to this example there is provided an apparatus including a first extensible non-volatile memory (NVM) hub (EN hub). The first EN hub includes an upstream interface port configured to couple the first EN hub to an NVM controller or to a second EN hub; a downstream interface port configured to couple the first EN hub to a third EN hub or to a NVM device; at least one NVM device port, each NVM device port configured to couple the first EN hub to a respective NVM device via a NVM channel; and an EN hub controller. The EN hub controller includes command logic configured to initialize the first EN hub in response to an initialize chain command from the NVM controller, the initializing including enumerating each NVM device coupled to the first EN hub and each of one or more associated NVM dies.

Example 2

This example includes the elements of example 1, wherein the command logic is configured to store a first EN hub identifier to the first EN hub; identify each NVM device coupled to the first EN hub at a respective NVM device port; assign for each NVM device, a volume address to each associated NVM die and associate each assigned volume address with the respective NVM device port; and provide a NVM device port identifier and associated one or more volume addresses to the NVM controller.

Example 3

This example includes the elements of example 2, wherein the first EN hub identifier is determined by the NVM controller.

Example 4

This example includes the elements of any one of example 2 and 3, wherein the command logic is configured to determine a second EN hub identifier based, at least in part, on the first EN hub identifier.

Example 5

This example includes the elements of any one of examples 1 through 4, wherein the command logic is further configured to determine whether the downstream interface port of the first EN hub is coupled to a second EN hub.

Example 6

This example includes the elements of any one of examples 1 through 5, wherein the command logic is further configured to transmit a received command out the downstream interface port if the received command is not destined for the first EN hub.

Example 7

This example includes the elements of example 6, wherein the command logic is further configured to determine whether the received command is destined for the first EN hub.

Example 8

This example includes the elements of any one of examples 6 and 7, wherein the EN hub controller further includes a NVM timing generator and the command logic is further configured to regenerate the received command based, at least in part, on an output from the NVM timing generator.

Example 9

This example includes the elements of any one of examples 1 through 8, wherein the command logic is further configured to identify a target NVM die for a memory access operation based, at least in part, on a target EN hub identifier, a target NVM device port identifier and a target volume address of the target NVM die.

Example 10

This example includes the elements of example 9, wherein the EN controller further includes data write logic, the memory access operation is a write operation, the command logic is further configured to receive data to be written at the upstream interface port of the first EN hub and the data write logic is configured to transmit the received data out the target NVM device port to a target NVM device associated with the target NVM die.

Example 11

This example includes the elements of example 9 and/or 10, wherein the EN controller further includes data read logic, the memory access operation is a read operation, the data read logic is configured to receive read data at the target NVM device port and the command logic is configured to transmit the read data out the upstream interface port of the first EN hub.

Example 12

This example includes the elements of any one of examples 1 through 10, wherein the EN hub controller further includes data read logic, the command logic is further configured to transmit at least one of data received on the downstream interface port and data read from a target NVM die and received by the data read logic on a target NVM device port.

Example 13

This example includes the elements of any one of examples 9 through 11, wherein the EN hub controller further includes ZQ calibration logic configured to perform ZQ calibration of a selected NVM device channel coupling a selected NVM device port and a selected NVM device and the command logic is configured to allow memory access operations to continue for one or more unselected NVM devices during ZQ calibration of the selected NVM device channel.

Example 14

This example includes the elements of any one of examples 1 through 10, wherein the EN hub controller further includes an error correction code (ECC) logic configured to implement error correction.

Example 15

This example includes the elements of example 14, wherein the ECC logic is configured to attach an ECC to data being stored in a selected NVM device; determine an error syndrome of data read from the selected NVM device; and correct the data read from the selected NVM device based, at least in part on, the error syndrome.

Example 16

This example includes the elements of any one of examples 14 and 15, wherein the ECC logic is configured to be enabled or disabled.

Example 17

This example includes the elements of any one of examples 1 through 5 and 8 through 11, wherein the command logic is further configured to command a selected NVM device to enter a low power standby state if the selected NVM device is idle.

Example 18

This example includes the elements of any one of examples 1 through 5, wherein the EN hub is configured to exit an initialization state and enter a normal operational state when enumeration is completed.

Example 19

This example includes the elements of example 1, wherein the EN hub is a NAND-type flash memory hub configured to couple to one or more NAND device(s).

Example 20

This example includes the elements of example 1, wherein the NVM controller is a solid state drive (SSD) controller.

Example 21

This example includes the elements of example 19, wherein communication with each NAND device corresponds to at least one of Open NAND Flash Interface (ONFi) Specification, version 3.0, published Mar. 9, 2011, by the ONFi Workgroup and the Open NAND Flash Interface Specification, version 4.0, published Apr. 2, 2014, by the ONFi Workgroup.

Example 22

According to this example there is provided a method including initializing, by command logic, a first extensible non-volatile memory (NVM) hub (EN hub) in response to an initialize chain command from an NVM controller, the initializing comprising enumerating each NVM device coupled to the first EN hub and each of one or more associated NVM dies.

Example 23

This example includes the elements of example 22, and further includes storing, by the command logic, a first EN hub identifier to the first EN hub; identifying, by the command logic, each NVM device coupled to the first EN hub at a respective NVM device port; assigning, by the command logic, for each NVM device, a volume address to each associated NVM die and associating, by the command logic, each assigned volume address with the respective NVM device port; and providing, by the command logic, a NVM device port identifier and associated one or more volume addresses to the NVM controller.

Example 24

This example includes the elements of example 23, wherein the first EN hub identifier is determined by the NVM controller.

Example 25

This example includes the elements of any one of example 23 and 24, and further includes determining, by the command logic, a second EN hub identifier based, at least in part, on the first EN hub identifier.

Example 26

This example includes the elements of any one of example 22 through 25, wherein the initializing further includes determining, by the command logic, whether a downstream port of the first EN hub is coupled to a second EN hub.

Example 27

This example includes the elements of example 20, and further includes transmitting, by the command logic, a received command out a downstream port if the received command is not destined for the first EN hub.

Example 28

This example includes the elements of example 25, and further includes determining, by the command logic, whether the received command is destined for the first EN hub.

Example 29

This example includes the elements of any one of examples 27 and 28, and further includes regenerating, by the command logic, the received command based, at least in part, on an output from a NVM timing generator.

Example 30

This example includes the elements of any one of examples 22 through 26, and further includes identifying, by the command logic, a target NVM die for a memory access operation, the identifying based, at least in part, on a target EN hub identifier, a target NVM device port identifier and a target volume address of the target NVM die.

Example 31

This example includes the elements of example 30, wherein the memory access operation is a write operation and further including receiving, by the command logic, data to be written at an upstream port of the first EN hub and transmitting, by data write logic, the received data out the target NVM device port to a target NVM device associated with the target NVM die.

Example 32

This example includes the elements of any one of examples 30 and 31, wherein the memory access operation is a read operation and further including receiving, by data read logic, read data at the target NVM device port and transmitting, by the command logic, the read data out an upstream port of the first EN hub.

Example 33

This example includes the elements of any one of examples 22 through 26, and further includes transmitting, by the command logic, at least one of data received on a downstream port and data read from a target NVM die and received, by data read logic, on a target NVM device port.

Example 34

This example includes the elements of any one of examples 20 through 24, and further includes performing, by ZQ calibration logic, ZQ calibration of a selected NVM device channel coupling a selected NVM device port and a selected NVM device, the command logic configured to allow memory access operations to continue for one or more unselected NVM devices during ZQ calibration of the selected NVM device channel.

Example 35

This example includes the elements of any one of examples 22 through 26, and further includes implementing, by an error correction code (ECC) logic, error correction.

Example 36

This example includes the elements of example 35, wherein implementing error correction includes attaching, by the ECC logic, an ECC to data being stored in a selected NVM device; determining, by the ECC logic, an error syndrome of data read from the selected NVM device; and correcting, by the ECC logic, the data read from the selected NVM device based, at least in part on, the error syndrome.

Example 37

This example includes the elements of any one of examples 35 and 36, and further includes enabling or disabling the ECC logic.

Example 38

This example includes the elements of any one of examples 22 through 26, and further includes commanding, by the command logic, a selected NVM device to enter a low power standby state if the selected NVM device is idle.

Example 39

This example includes the elements of example 22, and further includes exiting, by the EN hub, an initialization state and entering a normal operational state when enumeration is completed.

Example 40

This example includes the elements of any one of examples 22 through 26, and further includes configuring, by EN hub logic, the NVM controller to increase an acceptable communication response time based, at least in part, on a number of EN hubs included in a chain of EN hubs.

Example 41

This example includes the elements of example 22, wherein the EN hub is NAND-type flash memory hub.

Example 42

This example includes the elements of example 22, wherein the NVM controller is a solid state drive (SSD) controller.

Example 43

This example includes the elements of example 41, wherein communication with each NAND device corresponds to at least one of Open NAND Flash Interface (ONFi) Specification, version 3.0, published Mar. 9, 2011, by the ONFi Workgroup and the Open NAND Flash Interface Specification, version 4.0, published Apr. 2, 2014, by the ONFi Workgroup.

Example 44

According to this example there is provided a system including a non-volatile memory (NVM) controller; and a first extensible NVM hub (EN hub). The EN hub includes an upstream interface port coupled to a first controller channel port of the NVM controller; a downstream interface port configured to couple the first EN hub to another EN hub or to a NVM device; at least one NVM device port, each NVM device port configured to couple the first EN hub to a respective NVM device via a NVM channel; and an EN hub controller including command logic configured to initialize the first EN hub in response to an initialize chain command from the NVM controller, the initializing including enumerating each NVM device coupled to the first EN hub and each of one or more associated NVM dies. The NVM controller is configured to receive a memory access request from a host and to provide a related command to the first EN hub.

Example 45

This example includes the elements of example 44, and further includes a second EN hub coupled to the downstream interface port of the first EN hub.

Example 46

This example includes the elements of example 44, and further includes one or more additional EN hubs coupled in a chain to the first EN hub.

Example 47

This example includes the elements of any one of examples 44 through 46, and further includes one or more additional EN hubs coupled to a second controller channel port of the NVM controller.

Example 48

This example includes the elements of any one of examples 44 through 47, wherein the first controller channel port is coupled to the upstream interface port of the first EN hub by an controller channel, the controller channel configured to carry one or more of a command, address and data between the NVM controller and the first EN hub.

Example 49

This example includes the elements of any one of examples 44 through 46, wherein the first EN hub is coupled to each NVM device by a respective NVM channel, each NVM channel including a control channel and an input/output (I/O) channel, the I/O channel configured to carry one or more of a command, an address and data, the control channel configured to carry one or more control signals.

Example 50

This example includes the elements of any one of examples 44 through 46, wherein the command logic is configured to store a first EN hub identifier to the first EN hub; identify each NVM device coupled to the first EN hub at a respective NVM device port; assign for each NVM device, a volume address to each associated NVM die and associate each assigned volume address with the respective NVM device port; and provide a NVM device port identifier and associated one or more volume addresses to the NVM controller.

Example 51

This example includes the elements of example 50, wherein the first EN hub identifier is determined by the NVM controller.

Example 52

This example includes the elements of any one of examples 51 and 52, wherein the command logic is configured to determine a second EN hub identifier based, at least in part, on the first EN hub identifier.

Example 53

This example includes the elements of any one of examples 50 through 52, wherein the command logic is further configured to determine whether the downstream interface port of the first EN hub is coupled to a second EN hub.

Example 54

This example includes the elements of example 44, wherein the command logic is further configured to transmit a received command out the downstream interface port if the received command is not destined for the first EN hub.

Example 55

This example includes the elements of example 54, wherein the command logic is further configured to determine whether the received command is destined for the first EN hub.

Example 56

This example includes the elements of any one of examples 54 and 55, wherein the EN hub controller further includes a NVM timing generator and the command logic is further configured to regenerate the received command based, at least in part, on an output from the NVM timing generator.

Example 57

This example includes the elements of any one of examples 44 through 46, wherein the command logic is further configured to identify a target NVM die for a memory access operation based, at least in part, on a target EN hub identifier, a target NVM device port identifier and a target volume address of the target NVM die.

Example 58

This example includes the elements of example 57, wherein the EN controller further includes data write logic, the memory access operation is a write operation, the command logic is further configured to receive data to be written from the NVM controller at the upstream interface port of the first EN hub and the data write logic is configured to transmit the received data out the target NVM device port to a target NVM device associated with the target NVM die.

Example 59

This example includes the elements of any one of examples 57 and 58, wherein the EN controller further includes data read logic, the memory access operation is a read operation, the data read logic is configured to receive read data at the target NVM device port and the command logic is configured to transmit the read data out the upstream interface port of the first EN hub to the NVM controller.

Example 60

This example includes the elements of any one of examples 44 through 47, wherein the EN hub controller further includes data read logic, the command logic is further configured to transmit at least one of data received on the downstream interface port and data read from a target NVM die and received by the data read logic on a target NVM device port to the NVM controller.

Example 61

This example includes the elements of any one of examples 44 through 47, wherein the EN hub controller further includes ZQ calibration logic configured to perform ZQ calibration of a selected NVM device channel that couples a selected NVM device port and a selected NVM device and the command logic is configured to allow memory access operations to continue for one or more unselected NVM devices during ZQ calibration of the selected NVM device channel.

Example 62

This example includes the elements of any one of examples 44 through 47, wherein the EN hub controller further includes an error correction code (ECC) logic configured to implement error correction.

Example 63

This example includes the elements of example 62, wherein the ECC logic is configured to attach an ECC to data being stored in a selected NVM device; determine an error syndrome of data read from the selected NVM device; and correct the data read from the selected NVM device based, at least in part on, the error syndrome.

Example 64

This example includes the elements of any one of examples 62 and 63, wherein the NVM controller includes EN hub logic configured to enable or disable the ECC logic.

Example 65

This example includes the elements of any one of examples 44 through 47, wherein the command logic is further configured to command a selected NVM device to enter a low power standby state if the selected NVM device is idle.

Example 66

This example includes the elements of any one of examples 44 through 47, wherein the EN hub is configured to exit an initialization state and enter a normal operational state when enumeration is completed.

Example 67

This example includes the elements of any one of examples 44 through 47, wherein the NVM controller further includes EN hub logic to configure the NVM controller to increase an acceptable communication response time based, at least in part, on a number of EN hubs included in a chain of EN hubs.

Example 68

This example includes the elements of example 49, wherein each NVM channel complies with at least one of Open NAND Flash Interface (ONFi) Specification, version 3.0, published Mar. 9, 2011, by the ONFi Workgroup and the Open NAND Flash Interface Specification, version 4.0, published Apr. 2, 2014, by the ONFi Workgroup.

Example 69

This example includes the elements of example 44, wherein the EN hub is a NAND-type flash memory hub.

Example 70

This example includes the elements of example 44, wherein the NVM controller is a solid state drive (SSD) controller.

Example 71

This example includes the elements of any one of examples 68 and 69, wherein communication with each NAND device corresponds to at least one of Open NAND Flash Interface (ONFi) Specification, version 3.0, published Mar. 9, 2011, by the ONFi Workgroup and the Open NAND Flash Interface Specification, version 4.0, published Apr. 2, 2014, by the ONFi Workgroup.

Example 72

This example includes the elements of example 44, further including a plurality of NVM devices.

Example 73

This example includes the elements of example 72, wherein the first EN hub and at least a subset of the plurality of NVM devices are integrated in an integrated circuit.

Example 74

This example includes the elements of example 73, wherein each of the subset of NVM devices is a NVM die.

Example 75

This example includes the elements of example 72, wherein each NVM device is coupled to at least one of the first EN hub and the second EN hub.

Example 76

Another example of the present disclosure is a system including at least one device arranged to perform the method of any one of samples 22 to 43.

Example 77

Another example of the present disclosure is a device comprising means to perform the method of any one of samples 22 to 43.

Example 78

According to this example there is provided a system including a processor; a chipset configured to couple the processor to a peripheral device; and a solid state drive (SSD) coupled to the chipset. The SSD includes a non-volatile memory (NVM) controller; at least one NVM device; and a first extensible NVM hub (EN hub). The EN hub includes an upstream interface port coupled to a first controller channel port of the NVM controller; a downstream interface port configured to couple the first EN hub to another EN hub or to an NVM device; at least one NVM device port, each NVM device port coupled to a respective NVM device via a respective NVM channel; and an EN hub controller. The EN hub controller includes command logic configured to initialize the first EN hub in response to an initialize chain command from the NVM controller, the initializing including enumerating each NVM device coupled to the first EN hub and each of one or more associated NVM dies. The NVM controller is configured to receive a memory access request from the processor and to provide a related command to the first EN hub.

Example 79

This example includes the elements of example 78, further including a second EN hub coupled to the downstream interface port of the first EN hub.

Example 80

This example includes the elements of example 78, further including one or more additional EN hubs coupled in a chain to the first EN hub.

Example 81

This example includes the elements of example 78, further including one or more additional EN hubs coupled to a second controller channel port of the NVM controller.

Example 82

This example includes the elements of any one of examples 78 through 81, wherein the first controller channel port is coupled to the upstream interface port of the first EN hub by a controller channel, the controller channel configured to carry one or more of a command, address and data between the NVM controller and the first EN hub.

Example 83

This example includes the elements of example 78, wherein NVM channel includes a control channel and an input/output (I/O) channel, the I/O channel configured to carry one or more of a command, an address and data, the control channel configured to carry one or more control signals.

Example 84

This example includes the elements of example 78, wherein the command logic is configured to store a first EN hub identifier to the first EN hub; identify each NVM device coupled to the first EN hub at a respective NVM device port; assign for each NVM device, a volume address to each associated NVM die and associate each assigned volume address with the respective NVM device port; and provide a NVM device port identifier and associated one or more volume addresses to the NVM controller.

Example 85

This example includes the elements of example 84, wherein the first EN hub identifier is determined by the NVM controller.

Example 86

This example includes the elements of example 85, wherein the command logic is configured to determine a second EN hub identifier based, at least in part, on the first EN hub identifier.

Example 87

This example includes the elements of any one of examples 84 through 86, wherein the command logic is further configured to determine whether the downstream interface port of the first EN hub is coupled to a second EN hub.

Example 88

This example includes the elements of example 78, wherein the command logic is further configured to transmit a received command out the downstream interface port if the received command is not destined for the first EN hub.

Example 89

This example includes the elements of example 88, wherein the command logic is further configured to determine whether the received command is destined for the first EN hub.

Example 90

This example includes the elements of any one of examples 88 and 89, wherein the EN hub controller further includes a NVM timing generator and the command logic is further configured to regenerate the received command based, at least in part, on an output from the NVM timing generator.

Example 91

This example includes the elements of example 78, wherein the command logic is further configured to identify a target NVM die for a memory access operation based, at least in part, on a target EN hub identifier, a target NVM device port identifier and a target volume address of the target NVM die.

Example 92

This example includes the elements of example 91, wherein the EN controller further includes data write logic, the memory access operation is a write operation, the command logic is further configured to receive data to be written from the NVM controller at the upstream interface port of the first EN hub and the data write logic is configured to transmit the received data out the target NVM device port to a target NVM device associated with the target NVM die.

Example 93

This example includes the elements of any one of examples 91 through 92, wherein the EN controller further includes data read logic, the memory access operation is a read operation, the data read logic is configured to receive read data at the target NVM device port and the command logic is configured to transmit the read data out the upstream interface port of the first EN hub to the NVM controller.

Example 94

This example includes the elements of any one of examples 78 through 81, wherein the EN hub controller further includes data read logic, the command logic is further configured to transmit at least one of data received on the downstream interface port and data read from a target NVM die and received by the data read logic on a target NVM device port to the NVM controller.

Example 95

This example includes the elements of any one of examples 78 through 81, wherein the EN hub controller further includes ZQ calibration logic configured to perform ZQ calibration of a selected NVM device channel that couples a selected NVM device port and a selected NVM device and the command logic is configured to allow memory access operations to continue for one or more unselected NVM devices during ZQ calibration of the selected NVM device channel.

Example 96

This example includes the elements of example 78, wherein the EN hub controller further includes error correction code (ECC) logic configured to implement error correction.

Example 97

This example includes the elements of example 96, wherein the ECC logic is configured to attach an ECC to data being stored in a selected NVM device; determine an error syndrome of data read from the selected NVM device; and correct the data read from the selected NVM device based, at least in part on, the error syndrome.

Example 98

This example includes the elements of any one of examples 96 and 97, wherein the NVM controller includes an EN hub logic configured to enable or disable the ECC logic.

Example 99

This example includes the elements of any one of examples 78 through 81, wherein the command logic is further configured to command a selected NVM device to enter a low power standby state if the selected NVM device is idle.

Example 100

This example includes the elements of any one of examples 78 through 81, wherein the EN hub is configured to exit an initialization state and enter a normal operational state when enumeration is completed.

Example 101

This example includes the elements of any one of examples 78 through 81, wherein the NVM controller further includes an EN hub logic to configure the NVM controller to increase an acceptable communication response time based, at least in part, on a number of EN hubs included in a chain of EN hubs.

Example 102

This example includes the elements of example 78, wherein each NVM channel complies with at least one of Open NAND Flash Interface (ONFi) Specification, version 3.0, published Mar. 9, 2011, by the ONFi Workgroup and the Open NAND Flash Interface Specification, version 4.0, published Apr. 2, 2014, by the ONFi Workgroup.

Example 103

This example includes the elements of example 78, wherein the EN hub is a NAND-type flash memory hub.

Example 104

This example includes the elements of example 78, wherein the downstream port is coupled to an NVM device.

Example 105

This example includes the elements of example 78, wherein communication with each NVM device corresponds to at least one of Open NAND Flash Interface (ONFi) Specification, version 3.0, published Mar. 9, 2011, by the ONFi Workgroup and the Open NAND Flash Interface Specification, version 4.0, published Apr. 2, 2014, by the ONFi Workgroup.

Example 106

This example includes the elements of example 78, wherein the SSD includes a plurality of NVM devices.

Example 107

This example includes the elements of example 106, wherein the first EN hub and at least a subset of the plurality of NVM devices are integrated in an integrated circuit.

Example 108

This example includes the elements of example 107 wherein each of the subset of NVM devices is a NVM die.

Example 109

This example includes the elements of example 106, wherein each NVM device is coupled to at least one of the first EN hub and the second EN hub.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. An apparatus comprising:
 a first extensible non-volatile memory (NVM) hub (EN hub) comprising:
  an upstream interface port configured to couple the first EN hub to an NVM controller or to a second EN hub;
  a downstream interface port configured to couple the first EN hub to a third EN hub or to a NVM device;
  at least one NVM device port, each NVM device port configured to couple the first EN hub to a respective NVM device via a NVM channel; and
  an EN hub controller comprising command logic configured to initialize the first EN hub in response to an initialize chain command from the NVM controller, the initializing comprising to enumerate each NVM device coupled to the first EN hub and each of one or more associated NVM dies; wherein the command logic is further configured to identify a target NVM device for a memory access operation based, at least in part, on a target EN hub identifier, a target NVM device port identifier and a target volume address of the target NVM device.

2. The apparatus of claim 1, wherein the command logic is configured to store a first EN hub identifier to the first EN hub; identify each NVM device coupled to the first EN hub at a respective NVM device port; assign for each NVM device, a volume address to each associated NVM die and associate each assigned volume address with the respective NVM device port; and provide a NVM device port identifier and associated one or more volume addresses to the NVM controller.

3. The apparatus of claim 1, wherein the command logic is further configured to transmit a received command out the downstream interface port if the received command is not destined for the first EN hub.

4. The apparatus of claim 3, wherein the EN hub controller further comprises a NVM timing generator and the command logic is further configured to regenerate the received command based, at least in part, on an output from the NVM timing generator.

5. The apparatus of claim 1, wherein the EN hub controller further comprises ZQ calibration logic configured to perform ZQ calibration of a selected NVM device channel to couple a selected NVM device port and a selected NVM device and the command logic is configured to allow memory access operations to continue for one or more unselected NVM devices during ZQ calibration of the selected NVM device channel.

6. The apparatus of claim 1, wherein the EN hub controller further comprises error correction code (ECC) logic configured to attach an ECC to data being stored in a selected NVM device; determine an error syndrome of data read from the selected NVM device; and correct the data read from the selected NVM device based, at least in part on, the error syndrome.

7. The apparatus of claim 1, wherein the command logic is further configured to command a selected NVM device to enter a low power standby state if the selected NVM device is idle.

8. A method comprising:
 initializing, by command logic, a first extensible non-volatile memory (NVM) hub (EN hub) in response to an initialize chain command from an NVM controller, the initializing comprising enumerating each NVM device coupled to the first EN hub and each of one or more associated NVM dies; and
 performing, by ZQ calibration logic, ZQ calibration of a selected NVM device channel coupling a selected NVM device port and a selected NVM device, the command logic configured to allow memory access operations to continue for one or more unselected NVM devices during ZQ calibration of the selected NVM device channel.

9. The method of claim 8, wherein the initializing comprises:
 storing, by the command logic, a first EN hub identifier to the first EN hub;
 identifying, by the command logic, each NVM device coupled to the first EN hub at a respective NVM device port;
 assigning, by the command logic, for each NVM device, a volume address to each associated NVM die and associating, by the command logic, each assigned volume address with the respective NVM device port; and
 providing, by the command logic, a NVM device port identifier and associated one or more volume addresses to the NVM controller.

10. The method of claim 8, further comprising transmitting, by the command logic, a received command out a downstream port if the received command is not destined for the first EN hub.

11. The method of claim 10, further comprising regenerating, by the command logic, the received command based, at least in part, on an output from a NVM timing generator.

12. The method of claim 8, further comprising implementing, by error correction code (ECC) logic, error correction, the implementing comprising:
- attaching, by the ECC logic, an ECC to data being stored in a selected NVM device;
- determining, by the ECC logic, an error syndrome of data read from the selected NVM device; and
- correcting, by the ECC logic, the data read from the selected NVM device based, at least in part on, the error syndrome.

13. The method of claim 8, further comprising commanding, by the command logic, a selected NVM device to enter a low power standby state if the selected NVM device is idle.

14. The method of claim 8, further comprising configuring, by EN hub logic, the NVM controller to increase an acceptable communication response time based, at least in part, on a number of EN hubs included in a chain of EN hubs.

15. An system comprising:
- a processor;
- a chipset configured to couple the processor to a peripheral device; and
- a solid state drive (SSD) coupled to the chipset, the SSD comprising:
  - a non-volatile memory (NVM) controller;
  - at least one NVM device; and
  - a first extensible NVM hub (EN hub) comprising:
    - an upstream interface port coupled to a first controller channel port of the NVM controller;
    - a downstream interface port configured to couple the first EN hub to another EN hub or to an NVM device;
    - at least one NVM device port, each NVM device port coupled to a respective NVM device via a respective NVM channel; and
    - an EN hub controller comprising command logic configured to initialize the first EN hub in response to an initialize chain command from the NVM controller, the initialize comprising to enumerate each NVM device coupled to the first EN hub and each of one or more associated NVM dies, the NVM controller configured to receive a memory access request from the processor and to provide a related command to the first EN hub;
wherein the EN hub controller further comprises error correction code (ECC) logic configured to attach an ECC to data being stored in a selected NVM device; determine an error syndrome of data read from the selected NVM device; and correct the data read from the selected NVM device based, at least in part on, the error syndrome.

16. The system of claim 15, further comprising one or more additional EN hubs coupled in a chain to the first EN hub.

17. The system of claim 15 wherein the command logic is configured to store a first EN hub identifier to the first EN hub; identify each NVM device coupled to the first EN hub at a respective NVM device port; assign for each NVM device, a volume address to each associated NVM die and associate each assigned volume address with the respective NVM device port; and provide a NVM device port identifier and associated one or more volume addresses to the NVM controller.

18. The system of claim 15, wherein the command logic is further configured to transmit a received command out the downstream interface port if the received command is not destined for the first EN hub.

19. The system of claim 18, wherein the EN hub controller further comprises a NVM timing generator and the command logic is further configured to regenerate the received command based, at least in part, on an output from the NVM timing generator.

20. The system of claim 15, wherein the command logic is further configured to command a selected NVM device to enter a low power standby state if the selected NVM device is idle.

21. The system of claim 15, wherein the NVM controller further comprises an EN hub logic to configure the NVM controller to increase an acceptable communication response time based, at least in part, on a number of EN hubs included in a chain of EN hubs.

\* \* \* \* \*